United States Patent
Iida et al.

(10) Patent No.: US 11,260,818 B2
(45) Date of Patent: Mar. 1, 2022

(54) SEAT CUSHION AIRBAG APPARATUS

(71) Applicant: TOYODA GOSEI CO., LTD., Kiyosu (JP)

(72) Inventors: Takashi Iida, Kiyosu (JP); Shigemi Mase, Kiyosu (JP); Shigeyuki Suzuki, Kiyosu (JP); Hitoshi Ida, Kiyosu (JP); Yasushi Masuda, Kiyosu (JP); Tadashi Yamada, Kiyosu (JP); Yusuke Kojima, Kiyosu (JP); Shuji Yamamoto, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 9 days.

(21) Appl. No.: 16/813,918

(22) Filed: Mar. 10, 2020

(65) Prior Publication Data
US 2020/0307492 A1 Oct. 1, 2020

(30) Foreign Application Priority Data

Mar. 29, 2019 (JP) .............................. JP2019-065347
Jan. 15, 2020 (JP) .............................. JP2020-004334

(51) Int. Cl.
B60R 21/207 (2006.01)
B60R 21/2338 (2011.01)
B60R 21/231 (2011.01)
B60R 21/237 (2006.01)
B60R 21/233 (2006.01)
B60R 21/235 (2006.01)

(52) U.S. Cl.
CPC .......... *B60R 21/207* (2013.01); *B60R 21/231* (2013.01); *B60R 21/233* (2013.01); *B60R 21/235* (2013.01); *B60R 21/237* (2013.01); *B60R 21/2338* (2013.01); *B60R 2021/23107* (2013.01); *B60R 2021/23308* (2013.01); *B60R 2021/23386* (2013.01); *B60R 2021/23538* (2013.01)

(58) Field of Classification Search
CPC . B60R 21/207; B60R 21/2338; B60R 21/231; B60R 21/237; B60R 2021/23386; B60R 2021/23538
USPC ..................... 280/730.1, 728.2, 743.1, 743.2
See application file for complete search history.

(56) References Cited

U.S. PATENT DOCUMENTS

2013/0056964 A1* 3/2013 Yamashita ............ B60R 21/207
280/730.1

FOREIGN PATENT DOCUMENTS

| EP | 2022685 A2 * | 2/2009 | ........... B60R 21/207 |
| JP | 2007331445 A * | 12/2007 | |
| JP | 2010052535 A * | 3/2010 | |
| JP | 2018-161968 A | 10/2018 | |

* cited by examiner

*Primary Examiner* — Keith J Frisby
(74) *Attorney, Agent, or Firm* — Posz Law Group, PLC

(57) ABSTRACT

A seat cushion airbag apparatus includes a support portion, an airbag, and a fastening portion. The support portion is arranged below the cushion portion of a conveyance seat. The airbag is arranged between the cushion portion and the support portion and at the center portion in the width direction of the conveyance seat. The fastening portion fastens the airbag to the support portion and is disposed in the lower portion of the airbag in the inflated state at a position rearward of the center in the front-rear direction.

12 Claims, 6 Drawing Sheets

SEAT CUSHION AIRBAG APPARATUS

BACKGROUND

1. Field

The present disclosure relates to a seat cushion airbag apparatus. A seat cushion airbag apparatus is configured to inflate an airbag arranged below the cushion portion, on which an occupant is seated, when a frontal impact is applied to or is predicted to be applied to a conveyance, thereby restricting forward movement of the lumbar region of the occupant.

2. Description of Related Art

When a frontal impact due to a frontal collision is applied to a vehicle, the lumbar region of the occupant, which is restrained by the seat belt device, may be disengaged from the lap belt portion and move (slide) forward depending on the seated posture of the occupant. A number of countermeasures against this phenomenon have been implemented or proposed.

One of such countermeasures is the seat cushion airbag apparatus disclosed in Japanese Laid-Open Patent Publication No. 2018-161968. The seat cushion airbag apparatus includes an airbag that is arranged at the center in the width direction of the vehicle seat and below the seat surface of the cushion portion in the seat cushion (seat portion). When a frontal impact due to a frontal collision is applied to or is predicted to be applied to the vehicle, the seat cushion airbag apparatus causes the gas generator to supply inflation gas to the airbag. The airbag is inflated to break the cushion portion and continues to be inflated upward between the left and right thighs of the occupant.

In an autonomous vehicle, an occupant may recline the seat back and take a relaxed posture (comfortable posture). If a frontal impact is applied to the vehicle in this state, the airbag is capable of receiving the pelvis of the occupant to restrict forward movement of the lumbar region.

However, the above publication discloses no structure for installing the airbag. Depending on the manner in which the airbag is installed, the airbag, when inflated, may be pushed forward by the pelvis tending to move forward and thus collapse forward. This reduces the pelvis receiving performance of the airbag, resulting in an insufficient performance in restricting forward movement of the lumbar region.

SUMMARY

It is an objective of the present disclosure to provide a seat cushion airbag apparatus that is capable of restricting forward movement of the lumbar region regardless of the seated posture of the occupant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a seat cushion airbag apparatus is provided that is used for a conveyance seat having a cushion portion configured such that an occupant is seated thereon. The seat cushion airbag apparatus includes a support portion, an airbag, and a fastening portion. The support portion is arranged below the cushion portion. The airbag is arranged between the cushion portion and the support portion and at a center portion in a width direction of the conveyance seat. The seat cushion airbag apparatus is configured to inflate the airbag with inflation gas to restrict forward movement of the lumbar region of the occupant. The fastening portion fastens the airbag to the support portion. The fastening portion is disposed rearward of a center in a front-rear direction of a lower portion of the airbag in an inflated state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle seat cushion airbag apparatus according to a first embodiment will now be described with reference to FIGS. 1 to 3.

In the following description, the advancing direction of the vehicle is defined as a forward direction. The backward, upward, downward, leftward, and rightward directions are defined with reference to the forward direction. Also, it is assumed that an occupant having a size equivalent to a crash test dummy is seated on the vehicle seat.

Figure 1:
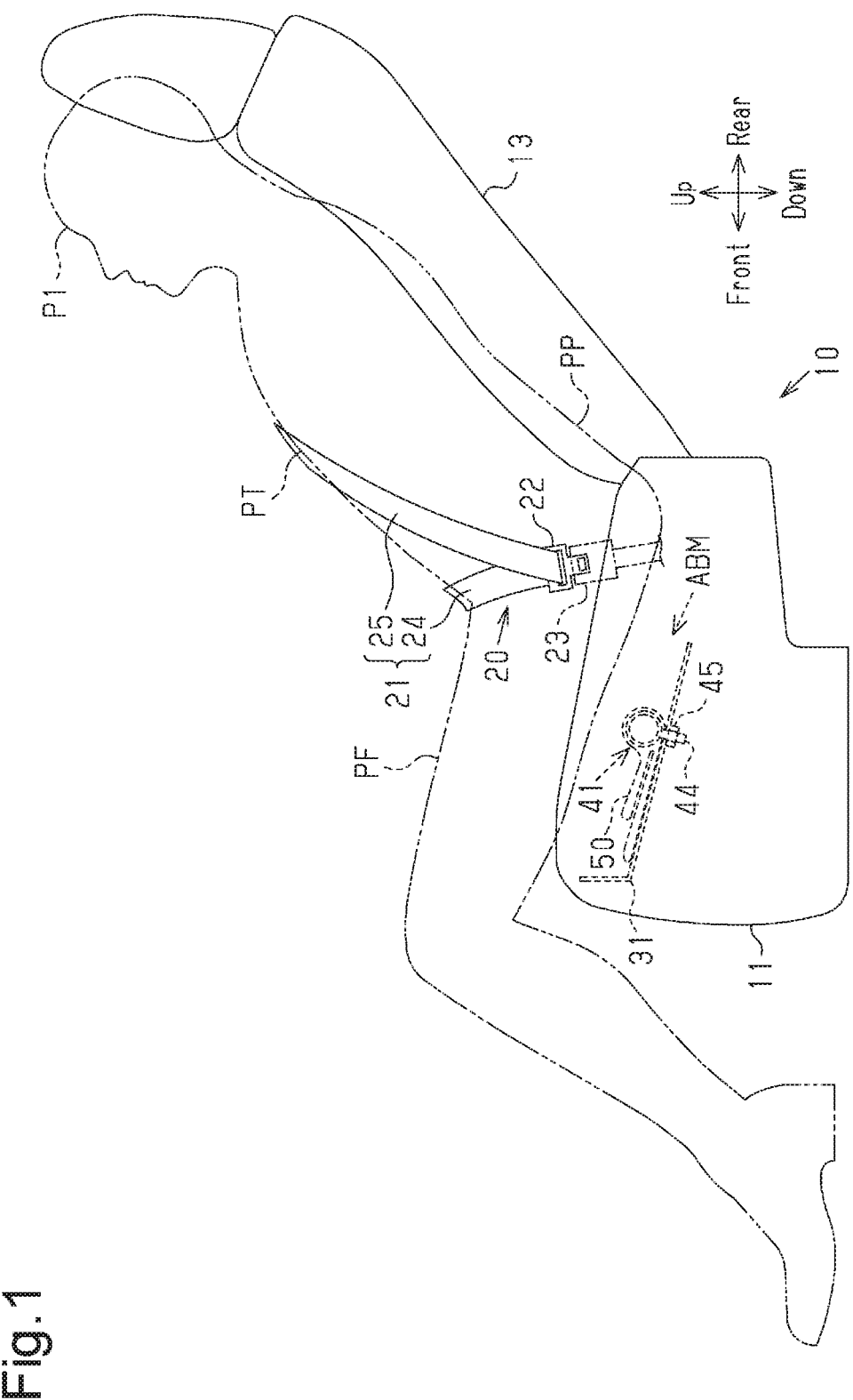
FIG. 1 is a side view showing, together with an occupant and a seat belt device, a vehicle seat in which a seat cushion airbag apparatus according to a first embodiment is installed.
Figure 2:
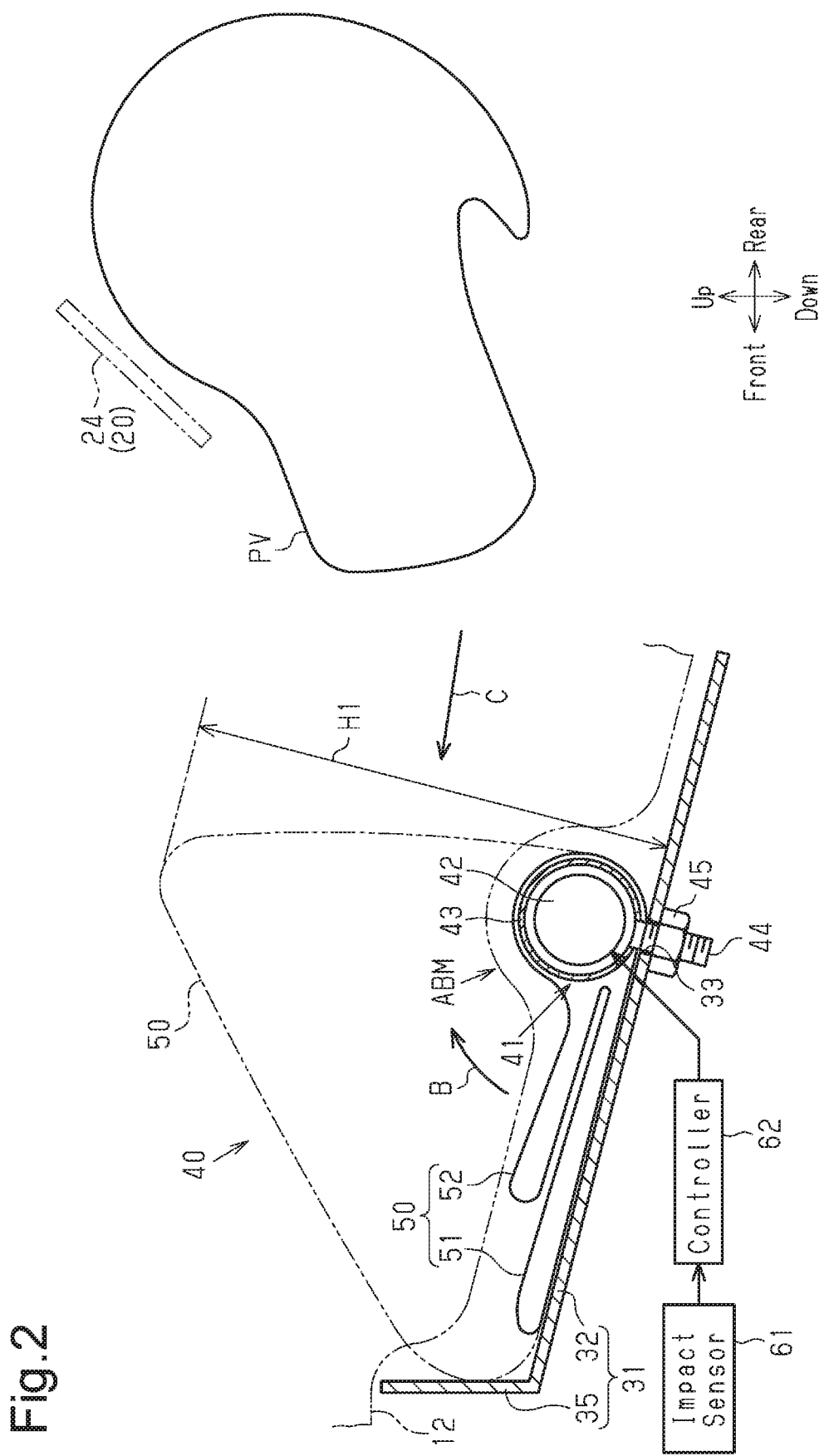
FIG. 2 is a cross-sectional side view showing, together with the pelvis of the occupant, the seat cushion airbag apparatus according to the first embodiment.

As shown in FIGS. 1 and 2, the vehicle, which is a conveyance, has a vehicle seat 10, which is a conveyance seat for a single person. The vehicle seat 10 includes a seat cushion (seat portion) 11 and a seat back (backrest portion) 13, which extends upward from the rear part of the seat cushion 11. The tilt angle of the seat back 13 is adjustable. The vehicle seat 10 is arranged in the vehicle such that the seat back 13 faces the front of the vehicle. The front-rear direction of the thus arranged vehicle seat 10 agrees with the front-rear direction of the vehicle, and the width direction of the vehicle seat 10 agrees with the width direction of the vehicle.

The seat cushion 11 includes a cushion portion 12, which is represented by a long dashed double-short dashed line in FIG. 2, and a seat pan (not shown), which supports the cushion portion 12 from below.

As shown in FIGS. 1 and 2, the vehicle includes a seat belt device 20, which restrains an occupant P1 seated on the cushion portion 12 and leans against the seat back 13.

As shown in FIG. 1, the seat belt device 20 has band-like webbing 21, a tongue 22, and a buckle 23, which is detachably engaged with the tongue 22. The tongue 22 is attached to the webbing 21 to be movable in the longitudinal direction of the webbing 21. The buckle 23 is located at a position on the inner side of the seat cushion 11. The vehicle also includes a seat belt retractor (not shown) on the outer side of the seat cushion 11. The webbing 21 has a first end, which is fixed to a part of the vehicle seat 10 that is on the outer side of the seat cushion 11, and a second end that is wound by the seat belt retractor (not shown). In the seat belt device 20, the tongue 22 is slid relative to the webbing 21 to change the lengths of a lap belt portion 24 and a shoulder belt portion 25.

The lap belt portion 24 is a portion of the webbing 21 between the tongue 22 to the first end (fixed end) and traverses the lumbar region PP of the seated occupant P1, while extending from one side of the lumbar region PP to the other side via the front side of the lumbar region PP. The shoulder belt portion 25 corresponds to a portion of the webbing 21 between the tongue 22 and the seat belt retractor and traverses from a shoulder of the seated occupant P1 to a side of the lumbar region PP via the front side of the thorax PT.

As shown in FIGS. 1 and 2, the vehicle includes a seat cushion airbag apparatus 40 (hereinafter, simply referred to as an airbag apparatus 40) that suppresses the submarine phenomenon. The submarine phenomenon refers to a phenomenon in which, when a frontal impact is applied to the vehicle, the lumbar region PP of the occupant P1 restrained to the vehicle seat 10 by the seat belt device 20 may be disengaged from the lap belt portion 24 and move (slide) forward.

The seat cushion 11 incorporates a plate-shaped support portion 31, which is fixed in a position between the seat pan (not shown) and the cushion portion 12 and forward of the cushion portion 12. The support portion 31 is made of a material that is harder than that of an airbag 50, which will be discussed below. The support portion 31 is made of, for example, metal or plastic. The support portion 31 includes a tilted plate portion 32 and a wall plate portion 35. The tilted plate portion 32 is tilted by a constant angle such that it rises toward the front side. The wall plate portion 35 extends upward from the front end of the tilted plate portion 32. The wall plate portion 35 is located at a position on the tilted plate portion 32 that is forward of and adjacent to the airbag 50 when the airbag 50, which will be discussed below, is inflated.

The airbag apparatus 40 includes the support portion 31, an airbag module ABM, an impact sensor 61, and a controller 62. The airbag module ABM includes a gas generator 41 and the airbag 50. The components constituting the airbag apparatus 40 will now be described.

<Gas Generator 41>

The gas generator 41 is configured to supply inflation gas to the airbag 50 and includes an inflator 42 and a retainer 43, which surrounds the inflator 42. The inflator 42 has an elongated shape (substantially columnar shape) and accommodates a gas generating agent (not shown), which generates inflation gas. The inflator 42 has a gas outlet (not shown), which discharges inflation gas, at a first end. A harness (not shown), which is wiring for delivering activation signals to the inflator 42, is connected to a second end of the inflator 42.

Most of the retainer 43 is formed to have a substantially tubular shape by bending, for example, a metal plate. Bolts 44 are fixed to the outer circumferential surface of the retainer 43. The bolts 44 are arranged at multiple positions spaced apart in the longitudinal direction and extend outward in the radial direction of the retainer 43.

<Airbag 50>

The airbag 50 is configured to raise the seat surface of the cushion portion 12 when inflated. The airbag 50 is formed by sewing fabric pieces (also referred to as base fabrics or fabric panels) together at the peripheral portions. The fabric pieces are preferably formed of a material having high strength and flexibility. The material may be, for example, woven cloth formed of polyester threads or polyamide threads.

The airbag 50 is arranged at a position that is between the cushion portion 12 and the support portion 31 and meets the following Conditions 1 and 2.

Condition 1: The position at the center portion of the seat cushion 11 in the width direction of the vehicle.

Condition 2: The position forward of the pelvis PV of the occupant P1 in the front-rear direction.

The airbag 50 has an inflated shape in which the height H1 from the tilted plate portion 32 of the support portion 31 is highest at the rear end and decreases toward the front side with distance from the rear end (refer to the long dashed double-short dashed line in FIG. 2).

<Securing Gas Generator 41 to Airbag 50>

The inflator 42 and the retainer 43 in the gas generator 41 are arranged in the lower portion of the interior of the airbag 50. Specifically, the inflator 42 and the retainer 43 are arranged rearward of the center in the front-rear direction of the lower portion of the airbag 50 to extend in the vehicle width direction. In the first embodiment, the inflator 42 and the retainer 43 are arranged at the rear end of the lower portion of the interior of the airbag 50.

The bolts 44 of the gas generator 41 are passed through the rear end of the lower portion of the airbag 50, so that the gas generator 41 is positioned relative to and secured to the airbag 50. Part of each bolt 44 is exposed from the airbag 50 to the space below. The harness is routed out of the airbag 50.

<Installation of Airbag Module ABM>

The tilted plate portion 32 has mounting holes 33 at positions spaced apart in the vehicle width direction. The bolts 44 of the gas generator 41 are passed through the mounting holes 33. Nuts 45 are threaded to the bolts 44 from below the tilted plate portion 32 so that the gas generator 41 is fastened to the tilted plate portion 32 together with the airbag 50. The gas generator 41, which has the bolts 44, and the nuts 45 constitute a fastening portion configured to fasten the lower portion of the airbag 50 to the support portion 31. The airbag 50 is fastened to the tilted plate portion 32 by holding the rear end of the lower portion of the airbag 50 between the retainer 43 and the tilted plate portion 32.

Before being inflated, the airbag 50 is arranged between the support portion 31 and the cushion portion 12 in a state folded in the vertical direction. To distinguish the two folded parts, the part on the lower side of the airbag 50 that is arranged on the tilted plate portion 32 will be referred to as a first inflatable portion 51, and the part folded onto the first inflatable portion 51 will be referred to as a second inflatable portion 52. The first inflatable portion 51 and the second inflatable portion 52 communicate with each other at the rear ends.

<Regarding Other Components of Airbag Apparatus 40>

The impact sensor 61 includes an acceleration sensor and detects a frontal impact applied to the vehicle. The controller 62 controls operation of the inflator 42 based on a detection signal from the impact sensor 61.

Operation of the airbag apparatus 40 according to the above-described first embodiment will now be described. Advantages that accompany the operation will also be described.

When a frontal impact is applied to the vehicle due to, for example, a frontal collision, the occupant P1, who is seated on the cushion portion 12, tends to move forward due to inertia. At this time, if the occupant P1 is seated in the vehicle seat 10 in a proper posture suitable for manual driving, the restraining action of the seat belt device 20 holds the occupant P1 on the cushion portion 12. That is, the lumbar region PP, which tends to move forward, is caught by the lap belt portion 24. The lap belt portion 24 restrains the lumbar region PP, restricting forward movement of the lumbar region PP.

However, depending on the posture of the occupant P1, the lumbar region PP tends to move forward. For example, in a case in which the occupant P1 is taking the comfortable posture when a frontal impact is applied to the vehicle, the lumbar region PP may tend to move forward. A case in which the occupant P1 is taking the comfortable posture when a frontal impact is applied to the vehicle is, for example, a case in which, during automated driving of the vehicle, the occupant P1 is leaning against the seat back 13, which is more tilted rearward than during manual driving, as shown in FIG. 1. In this case, since the upper body of the occupant P1 is more tilted rearward than during the manual driving, the lumbar region PP may fail to be properly caught by the lap belt portion 24. Thus, the lap belt portion 24 does not exert the function of restraining the lumbar region PP, so that the lumbar region PP may pass under the lap belt portion 24 and move forward.

In contrast, when an impact greater than or equal to a predetermined value is applied to the vehicle due to the frontal impact, and the impact sensor 61 detects the applied impact, the controller 62 delivers an activation signal for activating the inflator 42 to the inflator 42. In response to the activation signal, the inflator 42 supplies inflation gas to the first inflatable portion 51 and the second inflatable portion 52. The inflation gas inflates the first inflatable portion 51 and the second inflatable portion 52 as indicated by the long dashed double-short dashed line in FIG. 2. The inflation of the first inflatable portion 51 and the second inflatable portion 52 is carried out while canceling the folded state (while being deployed). The airbag 50, which is inflated while being deployed, pushes the cushion portion 12 upward.

A part of the seat surface of the cushion portion 12 that is between the left and right thighs PF of the occupant P1 and forward of the lumbar region PP (pelvis PV) is raised. The raised part of the cushion portion 12 receives the lumbar region PP (pelvis PV) of the occupant P1. The airbag 50 in an inflated state receives the forward force from the pelvis PV.

If the gas generator 41, which constitutes the fastening portion together with the nuts 45, is disposed in a part of the lower portion of the airbag 50 that is forward of the center in the front-rear direction, for example, at a front part of the lower portion of the airbag 50, the part of the airbag 50 in the inflated state that is rearward of the gas generator 41 is larger. If this part receives the above-described forward force from the pelvis PV, it collapses forward with the gas generator 41 serving as a pivot. This collapsing may lower the pelvis receiving performance of the airbag 50.

In this respect, the gas generator 41 of the first embodiment is disposed in a part of the lower portion of the airbag 50 that is rearward of the center in the front-rear direction. Thus, the part of the airbag 50 in the inflated state that is rearward of the gas generator 41 is smaller. If this part of the airbag 50 receives the forward force from the pelvis PV, the part is unlikely to collapse forward in relation to the gas generator 41. This allows the airbag 50 to maintain the inflated shape and readily deliver the performance of receiving the pelvis PV.

Particularly, in the first embodiment, the gas generator 41 is disposed at the rear end of the lower portion of the airbag 50. Thus, the part of the airbag 50 in the inflated state that is rearward of the gas generator 41 is smallest possible. Thus, if this part of the airbag 50 receives the forward force from the pelvis PV, the part is effectively prevented from collapsing forward in relation to the gas generator 41.

In the first embodiment, the height H1 of the inflated airbag 50 is highest at the rear end. Accordingly, the pelvis PV, which tends to move forward, is received by the wide rear end face of the airbag 50, so that the forward movement of the lumbar region PP is effectively restricted.

The performance of receiving the pelvis PV by the airbag 50 in the inflated state is particularly exerted at the rear end. Therefore, the height H1 of the airbag 50 decreasing toward the front side in the first embodiment does not significantly affect the performance of receiving the pelvis PV by the airbag 50.

Further, in the first embodiment, the support portion 31 includes the upward extending wall plate portion 35 at a position that is forward of and adjacent to the airbag 50 in the inflated state. Accordingly, when receiving the forward force from the pelvis PV, the airbag 50 in the inflated state is prevented from moving further forward by contacting the wall plate portion 35. This feature further improves the performance of restricting the forward movement of the lumbar region PP by the airbag 50.

Figure 3:
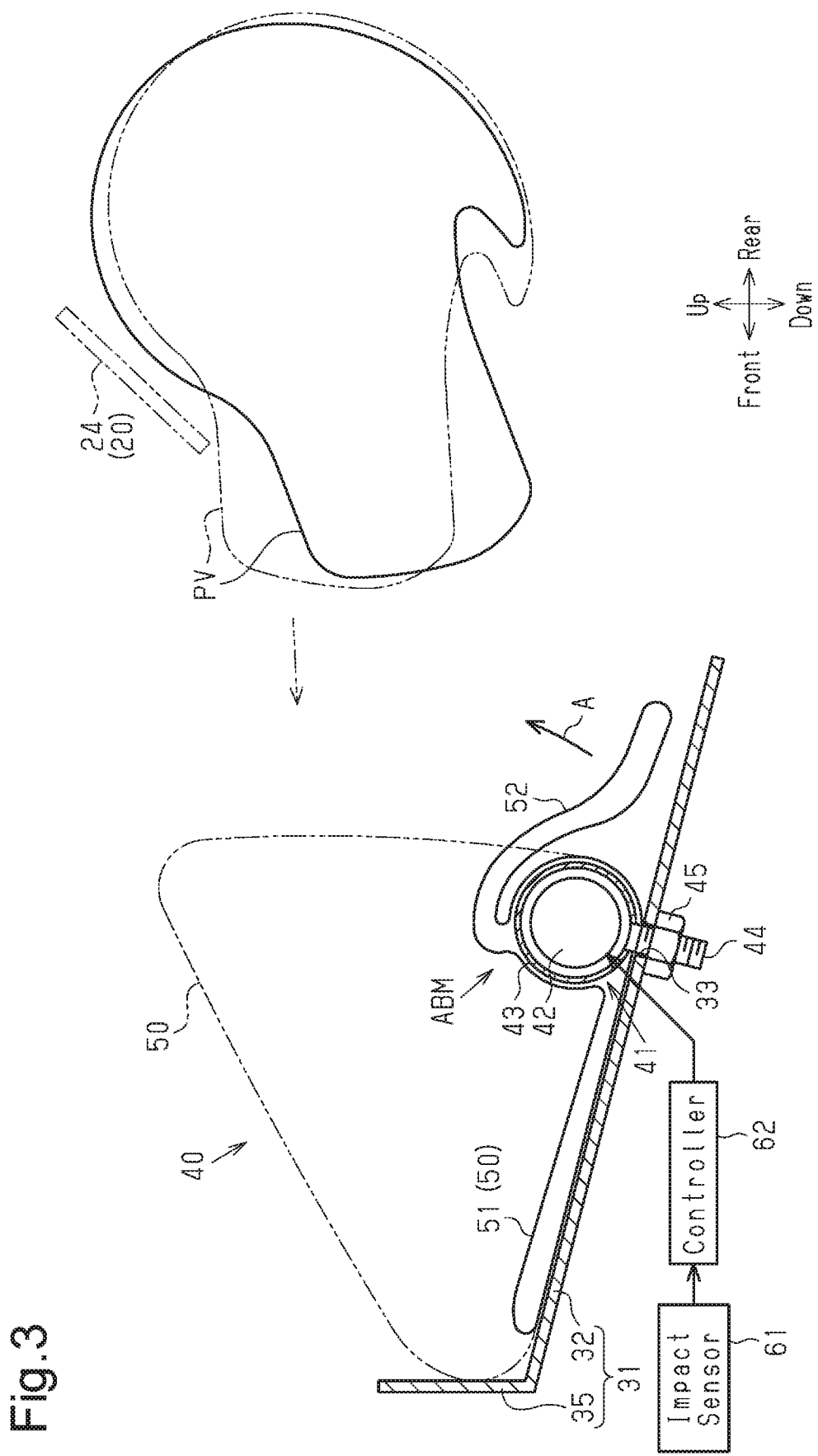
FIG. 3 is a cross-sectional side view showing, together with the pelvis of the occupant, the seat cushion airbag apparatus, in which the airbag is arranged in a manner different from that in FIG. 2.

FIG. 3 illustrates a hypothetical case in which the second inflatable portion 52 is located rearward of the first inflatable portion 51, and the front end of the second inflatable portion 52 communicates with the rear end of the first inflatable portion 51. This configuration has the following drawbacks. That is, when being supplied with inflation gas and inflated in the direction indicated by arrow A, the second inflatable portion 52 raises the front part of the pelvis PV to rotate the pelvis PV clockwise as viewed in FIG. 3 in a direction causing rearward tilt as indicated by the long dashed double-short dashed line in FIG. 3. In this case, the lumbar region PP of the occupant P1 may pass under the lap belt portion 24, which restrains the lumbar region PP.

In this respect, as shown in FIG. 2, the second inflatable portion 52 is folded onto the first inflatable portion 51 in the first embodiment, and the first inflatable portion 51 and the second inflatable portion 52 communicate with each other at the rear ends. Thus, the second inflatable portion 52 is inflated rearward with the rear end serving as the pivot as indicated by arrow B in FIG. 2. The direction of inflation is against the pelvis PV, which tends to move forward as indicated by arrow C. Therefore, the second inflatable portion 52 is unlikely to raise the front part of the pelvis PV to rotate the pelvis PV in a direction increasing the rearward tilt. The lumbar region PP of the occupant P1 is unlikely to pass under the lap belt portion 24.

In addition to the ones listed above, the first embodiment has the following advantages.

If the airbag 50 is arranged below the thighs PF, inflation of the airbag 50 raises the thighs PF, tilting the pelvis PV rearward, so that the lumbar region PP may not be properly caught by the lap belt portion 24.

In this respect, the airbag 50 of the first embodiment is inflated at a position that is displaced from the position below the thighs PF (between the left and right thighs PF). Thus, the thighs PF are unlikely to be raised. This restricts rearward tilt of the pelvis PV due to rise of the thighs PF.

The height H1 of the airbag 50 in the inflated state from the tilted plate portion 32 of the support portion 31 decreases toward the front side with distance from the rear end of the airbag 50.

Thus, the volume of the airbag 50 is smaller than in a case in which the height H1 is constant in the front-rear direction. This reduces the installation space for the airbag 50 and thus the installation space for the airbag module ABM in the vehicle seat 10, improving the mountability of the airbag 50. Also, having a relatively small volume, the airbag 50 is unlikely to interfere with the surrounding components in the vehicle seat 10 (seat cushion 11).

Before the airbag 50 is inflated, the second inflatable portion 52 is folded to be located on top of the first inflatable portion 51. Thus, the airbag 50 is compact in the front-rear direction before being inflated. This allows the airbag 50 to be installed even in a space that is small in the front-rear direction inside the vehicle seat 10.

Second Embodiment

Figure 4:
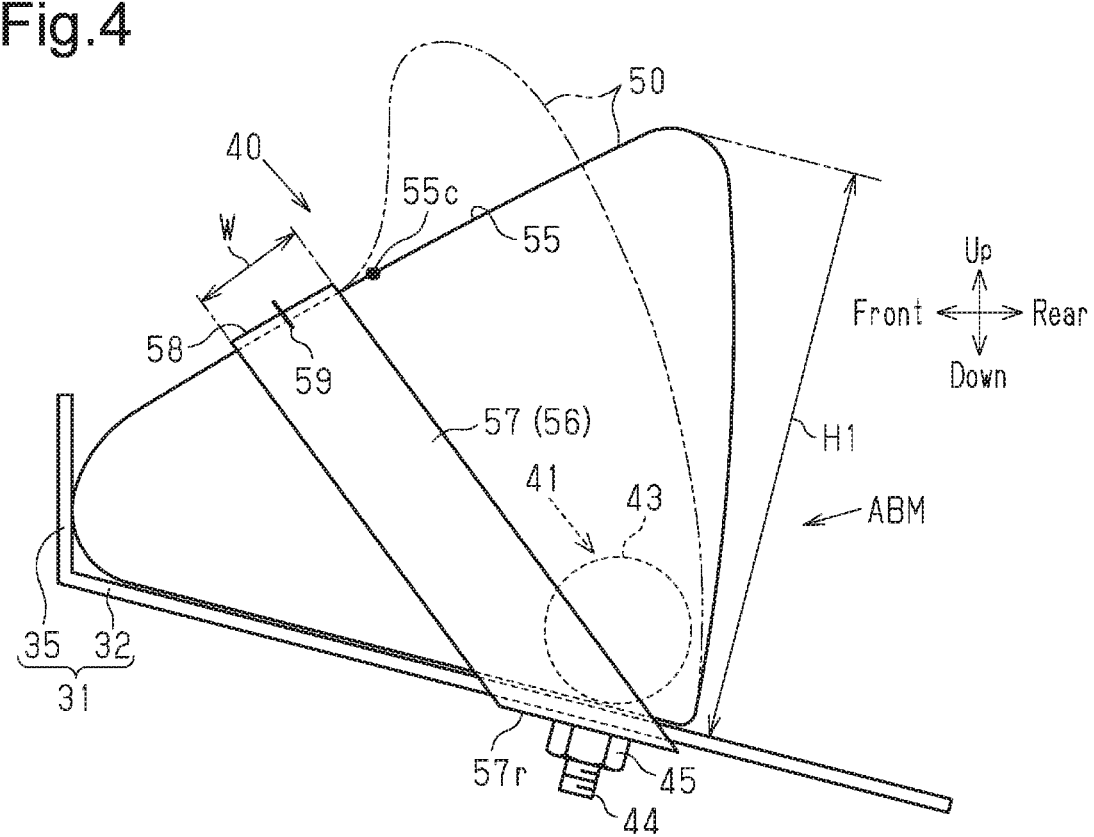
FIG. 4 is a side view of a seat cushion airbag apparatus according to a second embodiment.

A vehicle seat cushion airbag apparatus according to a second embodiment will now be described with reference to FIG. 4.

As in the case of the first embodiment, the airbag 50 in the second embodiment has an inflated shape in which the height H1 from the tilted plate portion 32 of the support portion 31 is highest at the rear end and decreases toward the front side with distance from the rear end. The airbag 50 in the inflated state has a tilted surface 55, which is lowered toward the front side.

The airbag apparatus 40 of the second embodiment includes a band-shaped tether 56. The tether 56 is constituted by a high-strength fabric piece that resists stretching. The tether 56 is formed by a single band and is arranged about the airbag 50. The tether 56 preferably has a width greater than or equal to 40 mm. The tether 56 includes two tilted portions 57 and a connecting portion 58. The tilted portions 57 are arranged on the left and right sides of the airbag 50 and are tilted to rise toward the front side when the airbag 50 is inflated. The connecting portion 58 is arranged forward of the airbag 50 and connects the front ends of the tilted portions 57 to each other. That is, the connecting portion 58 constitutes the front end of the tether 56. FIG. 4 shows only one of the tilted portions 57.

The length of the tether 56 is set to be shorter than the peripheral length of a part of the airbag 50 over which the tether 56 is placed.

The connecting portion 58 of the tether 56, which has the structure described above, is arranged at a position that is forward of and below a center 55c in the front-rear direction of the tilted surface 55.

A rear end 57r of each tilted portion 57 is fixed to the tilted plate portion 32 together with the airbag 50 by the gas generator 41 and the nut 45. As already described in the first embodiment, the bolts 44 of the gas generator 41 are passed through the airbag 50 and the mounting holes 33 of the tilted plate portion 32 (refer to FIG. 2), and the nuts 45 are fastened to the bolts 44. In addition, the nuts 45 are fastened to the bolts 44 with the rear ends 57r of the tilted portions 57 engaged with the bolts 44 in the second embodiment. Although not illustrated in FIG. 4, the rear end 57r of the tilted portion 57 on the back side of the sheet of FIG. 4 is engaged with the bolt 44 on the same side, which is not illustrated either. The nuts 45 are fastened to the bolts 44, so that the rear ends 57r of the tilted portions 57 are fastened to the tilted plate portion 32 together with the gas generator 41 and the airbag 50.

The connecting portion 58 of the tether 56 is fixed to the front end of the airbag 50 by a sewing thread 59, which sews the connecting portion 58 and the airbag 50 together.

The configuration other than the above is similar to the first embodiment. Thus, the same components as those in the first embodiment are given the same reference numerals, and detailed explanations are omitted.

Operation of the second embodiment, which is configured as described above, will now be described. Advantages that accompany the operation will also be described.

When a frontal impact is applied to the vehicle due to, for example, a frontal collision, the lumbar region PP (the pelvis PV) of the occupant P1 tends to move forward. At the same time, the airbag 50 of the airbag apparatus 40 is inflated by being supplied with inflation gas.

The length of the tether 56 is shorter than the peripheral length of the part of the airbag 50 over which the tether 56 is placed. Therefore, as the airbag 50 is inflated, the tilted portions 57 of the tether 56 are pulled taut.

Also, the rear ends 57r of the tilted portions 57 are fixed to the tilted plate portion 32. Thus, the tilted portions 57 pull parts of the airbag 50 to which the connecting portion 58 of the tether 56 is fixed rearward.

At this time, the connecting portion 58, the width W of which is greater than or equal to 40 mm, functions as a reaction force surface that generates a force (reaction force) acting against the forward force of the pelvis PV. In the tether 56, a tensile load is produced that pulls parts of the front portion of the airbag 50 to which the connecting portion 58 is fixed rearward. The function of the reaction force surface cannot be easily achieved in a case in which the connecting portion 58 is a narrow band having a width W smaller than 40 mm or a string.

The tensile load by the tether 56 and the internal pressure of the airbag 50 produce a load that receives the lumbar region PP (pelvis PV) of the occupant P1, which tends to move forward as described above. Thus, as compared with a case in which such a load is not produced, the performance of receiving the pelvis PV is improved.

When receiving a forward force from the pelvis PV, the airbag 50 in the inflated state is crushed without escaping (moving) forward, so as to absorb the energy of the pelvis PV, which tends to move forward due to the collision. The greater the amount of the forward deformation (crushed amount) of the airbag 50, the greater the amount of the absorbed energy becomes.

In this regard, the connecting portion 58 of the tether 56 of the second embodiment is arranged at a position that is forward of and below the center 55c in the front-rear direction of the tilted surface 55. Thus, when the airbag 50 in the inflated state receives a forward force from the pelvis PV, the tether 56 restricts forward escape (movement) of parts of the airbag 50 that include the region over which the tether 56 is placed and the region forward of and below the center 55c. Due to the restriction, when receiving the forward force from the pelvis PV, the region in the airbag 50 that is rearward of and above the tilted portion 57 does not escape (move) forward and is likely to crush as indicated by the long dashed double-short dashed line in FIG. 4.

Thus, the second embodiment increases the region in the airbag 50 that can be crushed without escaping (moving) forward as compared with a case in which the connecting portion 58 is arranged at a position rearward of and above the center 55c of the tilted surface 55. An increased amount of crushing of the airbag 50 without forward movement absorbs an increased amount of energy of the pelvis PV, which tends to move forward. This mitigates the impact applied to the lumbar region PP due to the impact of a collision.

In addition to the ones listed above, the second embodiment has the following advantages.

The connecting portion 58 of the tether 56 is fixed to the front part of the airbag 50. Thus, the connecting portion 58 is maintained to be connected to the airbag 50 not only when the airbag 50 is inflated, but also when the airbag 50 is yet to be inflated. Prior to inflation of the airbag 50, for example, when the airbag apparatus 40 before being installed in the vehicle seat 10 is transferred or when the airbag apparatus 40 is being installed in the vehicle seat 10, the connecting portion 58 is prevented from being displaced with respect to the airbag 50.

The connecting portion 58 is fixed to the front part of the airbag 50 by the sewing thread 59, which sews the connecting portion 58 and the airbag 50 together. This allows the connecting portion 58 to be fixed to the front part of the airbag 50 by the simple process of sewing the connecting portion 58 to the front part of the airbag 50.

The rear ends 57r of the respective tilted portions 57 are fixed to the tilted plate portion 32 by means of the bolts 44 and the nuts 45, which are used to fasten the airbag 50 to the tilted plate portion 32. This eliminates the necessity of providing a dedicated member for fixing the rear ends 57r to the tilted plate portion 32. The configuration also limits the increase in the number of components of the airbag apparatus 40 that accompanies the addition of the tether 56.

The above-described first and second embodiments may be modified as follows. The above-described embodiments and the following modifications can be combined as long as the combined modifications remain technically consistent with each other.

Modifications to First and Second Embodiments

The wall plate portion 35 may be omitted from the support portion 31.

The fastening portion may be disposed at a position forward of the position in the above-described embodiments (rear end) as long as the fastening portion is located in the region rearward of the center in the front-rear direction of the lower portion of the airbag 50.

Figure 5:
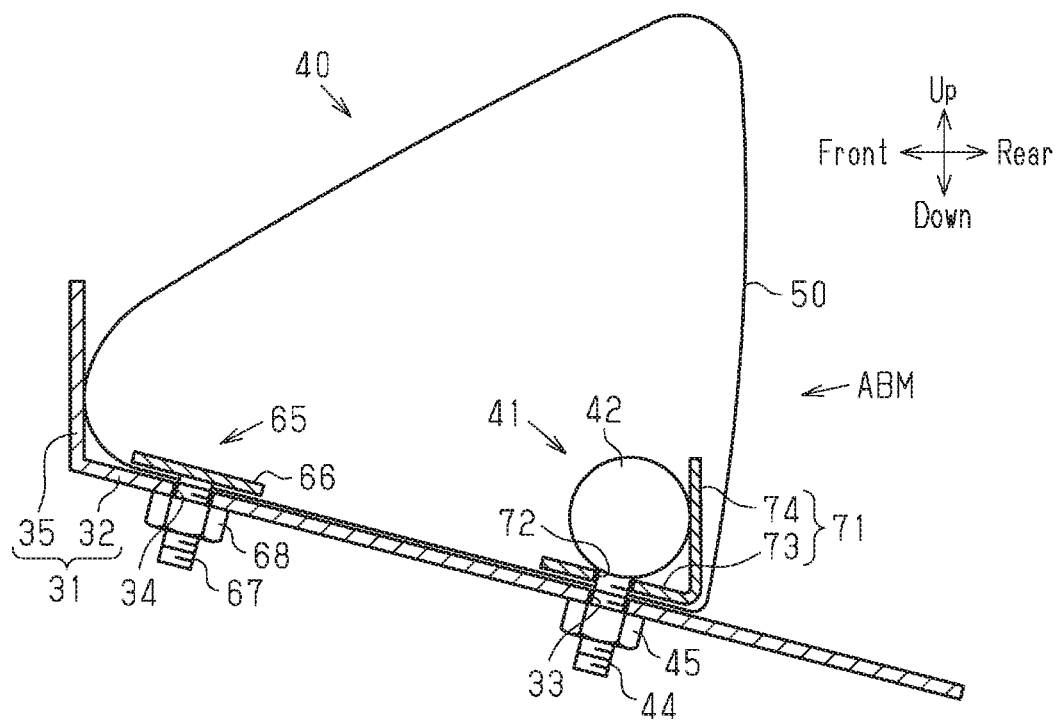
FIG. 5 is a cross-sectional side view showing a modification of the seat cushion airbag apparatus according to the first embodiment.

In the first embodiment, the gas generator 41 and the nuts 45 may collectively function as a rear fastening portion as shown in FIG. 5. In this case, in addition to the rear fastening portion, a front fastening portion for fastening the airbag 50 to the support portion 31 may be disposed forward of the rear fastening portion.

The front fastening portion may be constituted, for example, by a fastener 65 shown in FIG. 5. The fastener 65 includes a plate-shaped holding portion 66, bolts 67, which are orthogonal to and fixed to the holding portion 66, and nuts 68 threaded to the bolts 67. The holding portion 66 is arranged in the lower portion of the interior of the airbag 50 in the inflated state and forward of the rear fastening portion (the gas generator 41 and the nuts 45). The holding portion 66 is arranged, for example, at the front end. The bolts 67 are passed through the lower portion of the airbag 50, so that the holding portion 66 and the bolts 67 are positioned relative to and secured to the airbag 50.

The tilted plate portion 32 of the support portion 31 has mounting holes 34 at positions forward of the mounting holes 33. The bolts 67 are passed through the mounting holes 34, and the nuts 68 are threaded to the bolts 67 from below the tilted plate portion 32, so that the fastener 65 is fastened to the tilted plate portion 32 together with the airbag 50. The front portion of the airbag 50 is fastened to the tilted plate portion 32 by holding the front end of the lower portion of the airbag 50 between the holding portion 66 and the tilted plate portion 32 from above and below.

In this configuration, the airbag 50 is fastened to the support portion 31 by the rear fastening portion (the gas generator 41 and the nuts 45) and the front fastening portion (the fastener 65), which is located forward of the rear fastening portion. Thus, as compared with a case in which the airbag 50 is fastened to the support portion 31 by the rear fastening portion only, the airbag 50 in an inflated state is less likely to swing toward the occupant, and the performance of receiving the pelvis PV is improved.

The fastener 65 may be disposed in a part of the lower portion of the airbag 50 that is rearward of the front end. Even in this case, the airbag 50 in the inflated state is restricted from swinging as compared with a case in which the fastener 65 is not provided.

Although not illustrated, a front fastening portion may be disposed forward of the rear fastening portion of the airbag 50 in the second embodiment and modifications illustrated in FIGS. 6 to 9, which will be discussed below.

In the first embodiment, the gas generator 41 may be constituted by the inflator 42, without using the retainer 43, as shown in FIG. 5. In this case, the rear end of the lower portion of the airbag 50 is fastened to the tilted plate portion 32 by the gas generator 41 and the nuts 45.

In this case, the bolts 44 are fixed directly to the inflator 42. The bolts 44 are passed through the rear end of the lower portion of the airbag 50, so that the inflator 42 and the bolts 44 are positioned relative to and secured to the airbag 50. The bolts 44 are passed through the mounting holes 33 of the tilted plate portion 32, and the nuts 45 are threaded to the bolts 44, so that the rear end of the lower portion of the airbag 50 is fastened to the tilted plate portion 32 of the support portion 31.

Although not illustrated, the rear end of the lower portion of the airbag 50 may be fastened to the tilted plate portion 32 of the support portion 31 by the gas generator 41, which is constituted only by the inflator 42, and the nuts 45 also in the second embodiment and the modifications illustrated in FIGS. 6 to 9, which will be discussed below.

In the modifications without the retainer 43, a bracket 71 may be used in the fastening process of the inflator 42 as shown in FIG. 5. The bracket 71 may, for example, include a plate-shaped holding portion 73, which has mounting holes 72, and a plate-shaped wall portion 74, which extends upward from the rear end of the holding portion 73. The bolts 44 are passed through the mounting holes 72 so that the inflator 42 is secured to the bracket 71 and the wall portion 74 is located adjacent to and rearward of the inflator 42. The inflator 42, the bolts 44, the bracket 71, and the like are arranged at the rear end of the lower portion of the interior of the airbag 50. Further, the bolts 44 are passed through the rear end of the lower portion of the airbag 50, so that the bracket 71 is positioned relative to and secured to the airbag 50 together with the inflator 42. The bolts 44 are passed through the mounting holes 33 of the tilted plate portion 32, and the nuts 45 are threaded to the bolts 44, so that the rear end of the lower portion of the airbag 50 and the holding portion 73 of the bracket 71 are fastened to the tilted plate portion 32 of the support portion 31. The airbag 50 is fastened to the support portion 31 by holding the rear end of the lower portion of the airbag 50 between the holding portion 73 and the tilted plate portion 32.

This modification achieves the same operations and advantages as the first embodiment. The wall portion 74 also exerts the function of receiving some of the forward force from the pelvis PV.

Although not illustrated, the bracket 71 may be used in the fastening process of the gas generator 41 in the first and second embodiments and the modifications illustrated in FIGS. 6 to 9, which will be discussed below.

The wall portion 74 of the bracket 71 in the modification of FIG. 5 is not indispensable and may be omitted.

The bracket 71 in the modification of FIG. 5 may be omitted.

The fastening by at least one of the front fastening portion and the rear fastening portion may be achieved by members other than bolts and nuts.

The airbag 50 may be arranged between the cushion portion 2 and the support portion 31 without being folded in a spread state.

Substantially the entire airbag 50 may be constituted by an inflation portion. Also, the airbag 50 may also partially include a non-inflation portion, which is not supplied with inflation gas or inflated.

The inflated shape of the airbag 50 may be different from those in the above-described embodiments as long as the height from the tilted plate portion 32 of the support portion 31 is highest at the rear end. Possible inflated shapes include a shape in which the height H1 is constant at any given position in the front-rear direction of the airbag 50.

Figure 6:
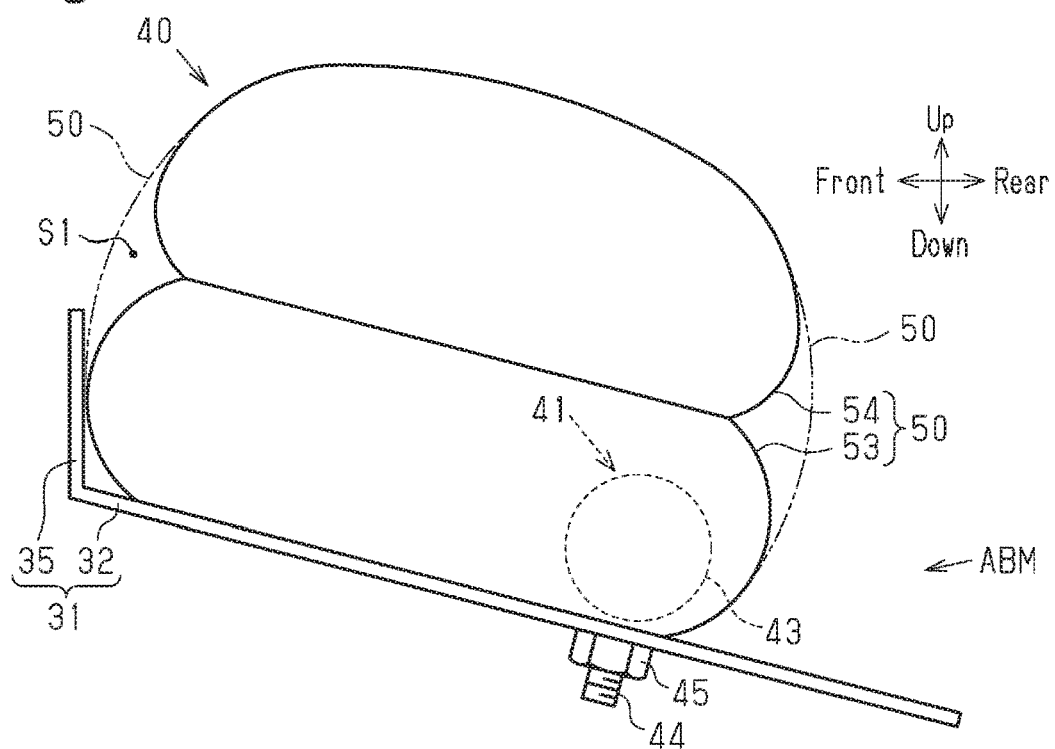
FIG. 6 is a side view showing another modification of the seat cushion airbag apparatus according to the first embodiment.

As shown in FIG. 6, the airbag 50 may be constituted by a lower inflation portion 53, which is fastened to the tilted plate portion 32 of the support portion 31 by the gas generator 41 and the nuts 45, and an upper inflation portion 54, which is arranged on top of the lower inflation portion 53.

The lower inflation portion 53 and the upper inflation portion 54 are connected to each other by an annular connecting portion (not shown), which connects the outer periphery of the upper part of the lower inflation portion 53 and the outer periphery of the lower part of the upper inflation portion 54. The lower inflation portion 53 and the upper inflation portion 54 communicate with each other through a through-portion, which is, for example, an opening disposed in the region surrounded by the connecting portion.

The above configuration is effective in increasing the height H1 of the airbag 50 from the tilted plate portion 32 of the support portion 31.

An annular space Si is provided between the periphery of the lower inflation portion 53 and the periphery of the upper inflation portion 54. As indicated by the long dashed double-short dashed lines in FIG. 6, the volume of the airbag 50 in the inflated state is reduced by the volume of the space Si as compared with a case in which the airbag 50 is constituted by a single inflation portion.

Modifications to Second Embodiment

Figure 7:
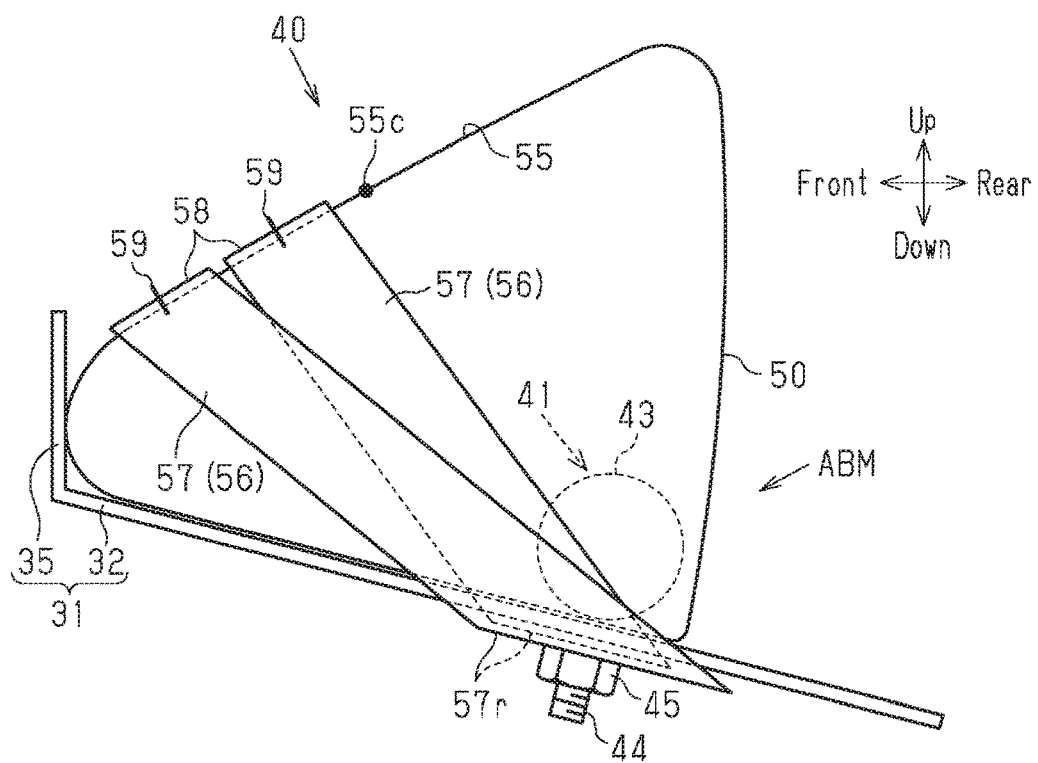
FIG. 7 is a side view showing a modification of the seat cushion airbag apparatus according to the second embodiment.

As shown in FIG. 7, two or more band-shaped tethers 56 similar to the one described in the second embodiment may be used. Although two tethers 56 are used in the modification of FIG. 7, three or more tethers 56 may be used. The connecting portions 58 of all the tethers 56 are preferably arranged at a position that is forward of and below the center 55c in the front-rear direction of the tilted surface 55 to ensure the crushed amount of the airbag 50.

This modification achieves the same operations and advantages as the second embodiment. Furthermore, the connecting portions 58 of the tethers 56 are arranged in a wide region that is forward of and below the center 55c of the tilted surface 55. Thus, when the airbag 50 in the inflated state receives a forward force from the pelvis PV, the tethers 56 restrict forward escape (movement) of a greater region in the airbag 50.

The multiple tethers 56 may be replaced by a single tether that has a width that is as wide as the sum of the widths W of the tethers 56.

Figure 8:
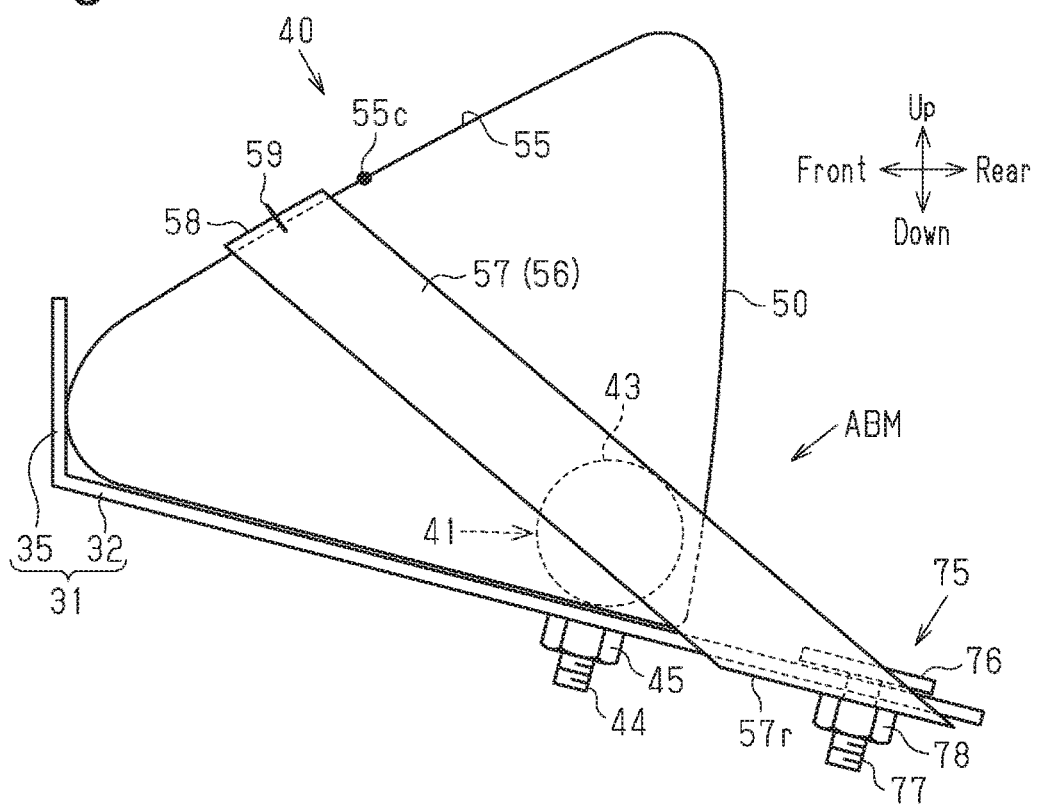
FIG. 8 is a side view showing another modification of the seat cushion airbag apparatus according to the second embodiment.

As shown in FIG. 8, the rear ends 57r of the tilted portions 57 may be fastened to the tilted plate portion 32 by a fastening portion that is disposed rearward of the airbag 50 in the inflated state and provided separately from the bolts 44 of the gas generator 41 and the nuts 45.

The fastening portion may be a fastener 75 that has the same structure as the fastener 65 shown in FIG. 5. The fastener 75 includes a plate-shaped holding portion 76, bolts 77, which are orthogonal to and fixed to the holding portion 76, and nuts 78 threaded to the bolts 77. The holding portion 76 is arranged on the tilted plate portion 32 and rearward of the airbag 50. The bolts 77 are passed through the tilted plate portion 32, and the rear ends 57r are engaged with the bolts 77. In this state, the nuts 78 are threaded to the bolts 77 from below the tilted plate portion 32 so that the rear ends 57r are fastened to the tilted plate portion 32. The rear ends 57r may be arranged between the holding portion 76 and the tilted plate portion 32 instead of between the tilted plate portion 32 and the nuts 78.

The bolts 77 may be directly fixed to the tilted plate portion 32. In this case, the bolts 77 may be fixed to the tilted plate portion 32 while projecting either downward or upward from the tilted plate portion 32. In either case, the rear ends 57r are engaged with the bolts 77 and held by the tilted plate portion 32 and the nuts 78 from above and below to be fixed to the tilted plate portion 32.

Figure 9:
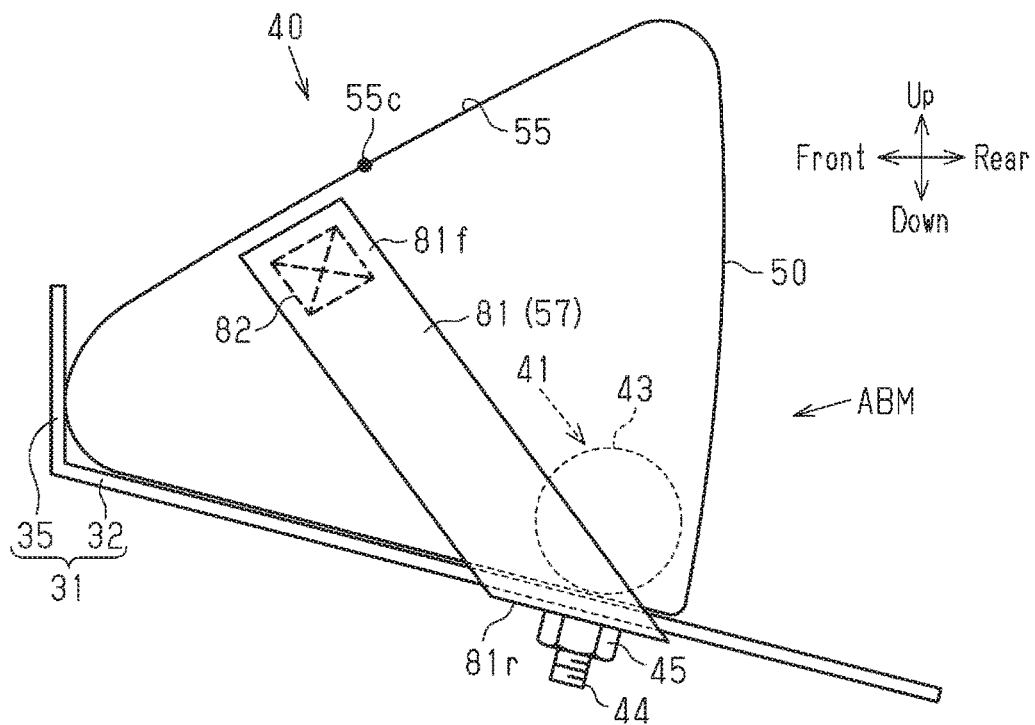
FIG. 9 is a side view showing another modification of the seat cushion airbag apparatus according to the second embodiment.

The tether 56 may be configured differently from that in the second embodiment. For example, in place of the tether 56, which is constituted by the two tilted portions 57 and the connecting portion 58, two tethers 81, which are each constituted only by a tilted portion 57 as shown in FIG. 9 may be provided. Only one of the tethers 81 is illustrated in FIG. 9. The length of each tether 81 is set to be shorter than the peripheral length of a part of the airbag 50 over which the tether 81 is placed. In this case, each tether 81 is tilted to rise toward the front side when the airbag 50 is inflated. A rear end 81r of each tether 81 is fixed to the tilted plate portion 32 by a bolt 44 and a nut 45. A front end 81f of each tether 81 is fixed to the front part of one of the left and right side surfaces of the airbag 50 by sewing using a sewing thread 82.

This modification achieves the same operations and advantages as the second embodiment, which uses the tether 56 of a single band.

In addition to being fixed to the tilted surface 55 of the airbag 50 at the connecting portion 58, the tether 56 may be fixed to the side surfaces of the airbag 50 at the front ends of the tilted portions 57.

The tethers 56, 81 may be fixed to the airbag 50 by methods other than sewing using the sewing threads 59, 82, for example, by using an adhesive or a fastener.

<Other Modifications>

The airbag 50 may be configured to be inflated to push and break the cushion portion 12, be projected outside the cushion portion 12, and be inflated upward in a region between the left and right thighs PF and forward of the lumbar region PP (pelvis PV). In this case, a part of the airbag 50 that is inflated outside the cushion portion 12 receives the pelvis PV.

The controller 62 may output an activation signal to the inflator 42 when predicting that a frontal impact due to a frontal collision will be applied to the vehicle, thereby causing the inflator 42 to discharge inflation gas.

The airbag apparatus 40 is particularly advantageous when employed in an autonomous vehicle, but may be employed in a manually operated normal vehicle. In this case also, the airbag apparatus 40 is effective to restrict the forward movement of the lumbar region PP of the occupant P1.

Vehicles in which the above-described airbag apparatus 40 can be employed include various industrial vehicles in addition to private cars.

The above-described disclosure may be applied not only to the airbag apparatus installed in a vehicle seat, but also to airbag apparatuses installed in seats of other conveyances such as aircrafts and ships.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A seat cushion airbag apparatus for a conveyance seat having a cushion portion configured such that an occupant is seated thereon, the seat cushion airbag apparatus comprising:
    a support portion that is arranged below the cushion portion;
    an airbag that is arranged between the cushion portion and the support portion and at a center portion in a width direction of the conveyance seat, the seat cushion airbag apparatus being configured to inflate the airbag with inflation gas to restrict forward movement of the lumbar region of the occupant;
    a fastening portion that fastens the airbag to the support portion, the fastening portion being disposed rearward of a center in a front-rear direction of a lower portion of the airbag in an inflated state; and
    a band-shaped tether arranged about the airbag, wherein
    the tether includes two tilted portions respectively arranged at opposite sides in the width direction of the airbag,
    a rear end of each tilted portion is fixed to the support portion,
    a front end of the tether is fixed to a front portion of the airbag, and
    each tilted portion is tilted to rise toward a front side when the airbag is inflated.

2. The seat cushion airbag apparatus according to claim 1, wherein the fastening portion is disposed at a rear end of the airbag in the inflated state.

3. The seat cushion airbag apparatus according to claim 1, wherein the airbag in the inflated state has such a shape that a height from the support portion is highest at a rear end.

4. The seat cushion airbag apparatus according to claim 3, wherein the airbag in the inflated state has such a shape that the height decreases toward a front side with distance from the rear end.

5. The seat cushion airbag apparatus according to claim 1, wherein
    the airbag before being inflated includes
        a first inflatable portion that is arranged on the support portion, and
        a second inflatable portion that is folded to be located on top of the first inflatable portion, and
    the first inflatable portion and the second inflatable portion communicate with each other at rear ends.

6. The seat cushion airbag apparatus according to claim 1, wherein
    the support portion includes a wall plate portion extending upward, and
    the wall plate portion is located at a position that is forward of and adjacent to the airbag in the inflated state.

7. The seat cushion airbag apparatus according to claim 1, wherein
    the fastening portion is a rear fastening portion, and
    the seat cushion airbag apparatus further comprises a front fastening portion that fastens the airbag to the support portion, the front fastening portion being disposed forward of the rear fastening portion.

8. The seat cushion airbag apparatus according to claim 1, wherein
    the tether is formed by a single band that includes the two tilted portions and a connecting portion that is arranged forward of the airbag and connects front ends of the tilted portions to each other, and
    the tether is fixed to a front end of the airbag at least at the connecting portion.

9. The seat cushion airbag apparatus according to claim 8, wherein a length of the tether is set to be shorter than a peripheral length of a part of the airbag over which the tether is placed.

10. The seat cushion airbag apparatus according to claim 1, wherein the front end of the tether is fixed to the front portion of the airbag by a sewing thread that sews the tether and the airbag together.

11. The seat cushion airbag apparatus according to claim 1, wherein a rear end of each tilted portion is fastened to the support portion by the fastening portion together with the airbag.

12. The seat cushion airbag apparatus according to claim 1, wherein
- the airbag in the inflated state includes a tilted surface that is lowered toward the front side, and
- the front end of the tether is arranged at a position that is forward of and below a center in the front-rear direction of the tilted surface.

* * * * *